(12) United States Patent
Chen et al.

(10) Patent No.: US 11,625,487 B2
(45) Date of Patent: Apr. 11, 2023

(54) FRAMEWORK FOR CERTIFYING A LOWER BOUND ON A ROBUSTNESS LEVEL OF CONVOLUTIONAL NEURAL NETWORKS

(71) Applicants: International Business Machines Corporation, Armonk, NY (US); MASSACHUSETTS INSTITUTE OF TECHNOLOGY, Cambridge, MA (US)

(72) Inventors: Pin-Yu Chen, Yorktown Heights, NY (US); Sijia Liu, Cambridge, MA (US); Akhilan Boopathy, Cambridge, MA (US); Tsui-Wei Weng, Cambridge, MA (US); Luca Daniel, Cambridge, MA (US)

(73) Assignees: INTERNATIONAL BUSINESS MACHINES CORPORATION, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 913 days.

(21) Appl. No.: 16/256,267

(22) Filed: Jan. 24, 2019

(65) Prior Publication Data

US 2020/0242252 A1    Jul. 30, 2020

(51) Int. Cl.
*G06F 21/57* (2013.01)
*G06N 3/08* (2006.01)
*G06N 20/00* (2019.01)
*G06N 3/04* (2023.01)

(52) U.S. Cl.
CPC ......... *G06F 21/577* (2013.01); *G06N 3/0481* (2013.01); *G06N 3/08* (2013.01); *G06N 20/00* (2019.01)

(58) Field of Classification Search
CPC .... G06F 21/577; G06N 20/00; G06N 3/0481; G06N 3/08
See application file for complete search history.

(56) References Cited

U.S. PATENT DOCUMENTS

| | | | |
|---|---|---|---|
| 6,473,746 B1 | 10/2002 | Zakrzewski | |
| 7,937,343 B2 | 5/2011 | Zakrzewski | |
| 10,529,320 B2 * | 1/2020 | Shafran | G10L 19/0212 |
| 11,017,269 B2 * | 5/2021 | Thiruvenkadam | G06V 10/454 |
| 11,048,879 B2 * | 6/2021 | Buhrmann | G06N 3/0454 |
| 11,210,584 B2 * | 12/2021 | Brand | G06F 17/15 |
| 11,386,328 B2 * | 7/2022 | Wong | G06N 3/0481 |

(Continued)

FOREIGN PATENT DOCUMENTS

WO    WO 2018/085697 A1    5/2018

OTHER PUBLICATIONS

Huan Zhang; Tsui-Wei Weng; Pin-Yu Chen; Cho-Jui Hsieh; Luca Daniel; Efficient Neural Network Robustness Certification with General Activation Functions; pp. 1-17; Nov. 2, 2018.*

(Continued)

*Primary Examiner* — Hosuk Song
(74) *Attorney, Agent, or Firm* — Peter Edwards, Esq.; McGinn I.P. Law Group, PLLC.

(57) ABSTRACT

A certification method, system, and computer program product include certifying an adversarial robustness of a convolutional neural network by deriving an analytic solution for a neural network output using an efficient upper bound and an efficient lower bound on an activation function and applying the analytic solution in computing a certified robustness.

20 Claims, 13 Drawing Sheets

(56) References Cited

U.S. PATENT DOCUMENTS

2018/0189635 A1* 7/2018 Olarig .................. G06N 3/0481
2018/0308203 A1* 10/2018 Appu .................... G06F 9/544
2020/0242252 A1* 7/2020 Chen ..................... G06N 3/084
2020/0351657 A1* 11/2020 Wentz ................... H04L 9/3268

OTHER PUBLICATIONS

Mel, et al. "The NIST Definition of Cloud Computing". Recommendations of the National Institute of Standards and Technology, Nov. 16, 2015.

A. Boopathy et al., "CNN-Cert: An Efficient Framework for Certifying Robustness of Convolutional Neural Networks" (Submitted on Nov. 29, 2018), https://arxiv.org/abs/1811.12395.

P.-Y. Chen, "A Clever Way to Resist Adversarial Attack," May 2, 2018. [Accessed Aug. 1, 2018] https://www.ibm.com/blogs/research/2018/05/cfever-adversarial-attack/.

T. W. Weng et al., "Towards Fast Computation of Certified Robustness for ReLU Networks." (Submitted on Apr. 25, 2018 (v1), last revised Oct. 2, 2018 (this version, v4)) https://arxiv.org/abs/1804.09699.

T. W. Weng et al., "Evaluating the Robustness of Neural Networks: An Extreme Value Theory Approach." (Submitted on Jan. 31, 2018), https://arxiv.org/abs/1801.10578.

K. Dvijotham et al., "A Dual Approach to Scalable Verification of Deep Networks." (Submitted on Mar. 17, 2018 (v1), last revised Aug. 3, 2018 (this version, v2)) https://arxiv.org/abs/1803.06567.

A. Raghunathan et al., "Certified Defenses against Adversarial Examples." (Submitted on Jan. 29, 2018) https://arxiv.org/abs/1801.09344.

* cited by examiner

FIG. 6

Expression of $A_U^r$ and $B_U^r$. $A_L^r$ and $B_L^r$ have exactly the same form as $A_U^r$ and $B_U^r$ but with $U$ and $L$ swapped.

| Blocks | $B_U^r$ |
|---|---|
| (i) Act-Conv Block | $W_{(\tilde{x},z),(\tilde{x},k)}^{r+}(\alpha_{U,(\tilde{x},k)}\odot\beta_{U,(\tilde{x},k)}) + W_{(\tilde{x},z),(\tilde{x},k)}^{r-}(\alpha_{L,(\tilde{x},k)}\odot\beta_{L,(\tilde{x},k)}) + b^r$ |
| (ii) Residual Block | $W^{r+} * (\alpha_U \odot \beta_U) + W^{r-} * (\alpha_L \odot \beta_L) + b^r$ |
|  | $A_{U,\text{net}}^r * b^{r-1} + B_{U,\text{net}}^r$ |
| (iv) Pooling Block | at location $(\bar{x}, z)$: $\sum_{\tilde{x} \in S_{\bar{x}}} \frac{(c - u_{(\tilde{x}+\bar{x},z)})1_{(\tilde{x}+\bar{x},z)}}{u_{(\tilde{x}+\bar{x},z)}^{-1}(\bar{x}+\bar{x},z)} + \gamma$ |
|  | $\gamma_0 = \frac{\sum_{\tilde{x}} \frac{u_{\bar{x}}^{-1}}{u_{\bar{x}}^{-1} - 1}}{\sum_{\tilde{x}} \frac{1}{u_{\bar{x}} - l_{\bar{x}}}}$ |
|  | $\gamma = \min\{\max\{\gamma_0, \max 1_S\}, \min u_S\}$ |

Note 1: $(\tilde{i}, \tilde{k}) = (i, j, k)$ denotes filter coordinate indices and $(\bar{x}, z) = (x, y, z)$ denotes output tensor indices.
Note 2: $A_U^r, B_U^r, A_L^r, B_L^r, W, \alpha, \beta, u, l$ are all tensors. $W^{r+}, W^{r-}$ contains only the positive, negative entries of $W^r$ with other entries equal 0.
Note 3: $A_L^r, B_L^r$ for pooling block are slightly different. Please see Appendix (c) for details.

Bounds of minimum adversarial distortion on pure CNN networks. - indicates the method is computationally infeasible.

| Network | $\ell_p$ norm | Certified Bounds | | | | CNN-Cert-Ada Improvement (%) | | Attack |
|---|---|---|---|---|---|---|---|---|
| | | CNN-Cert-Ada | Fast-Lin | Global-Lips | Dual-LP | vs. Fast-Lin | vs. Dual-LP | CW/EAD |
| MNIST, 4 layer 5 filters 8680 hidden nodes | $\ell_\infty$ | 0.0492 | 0.0406 | 0.0802 | 0.0456 | +21% | +8% | 0.1488 |
| | $\ell_2$ | 0.1794 | 0.1453 | 0.0491 | 0.1653 | +23% | +9% | 3.1407 |
| | $\ell_1$ | 0.3363 | 0.2764 | 0.0269 | 0.3121 | +22% | +8% | 14.4516 |
| MNIST, 4 layer 20 filters 34720 hidden nodes | $\ell_\infty$ | 0.0341 | 0.0291 | 0.0000 | - | +17% | - | 0.1494 |
| | $\ell_2$ | 0.1243 | 0.1039 | 0.0221 | - | +20% | - | 3.0159 |
| | $\ell_1$ | 0.2404 | 0.1993 | 0.0032 | - | +21% | - | 13.7950 |
| MNIST, 5 layer 5 filters 10680 hidden nodes | $\ell_\infty$ | 0.0306 | 0.0248 | 0.0000 | - | +23% | - | 0.1041 |
| | $\ell_2$ | 0.1263 | 0.1007 | 0.0235 | - | +25% | - | 1.8443 |
| | $\ell_1$ | 0.2482 | 0.2013 | 0.0049 | - | +23% | - | 11.6711 |
| CIFAR, 7 layer 5 filters 19100 hidden nodes | $\ell_\infty$ | 0.0042 | 0.0036 | 0.0000 | - | +17% | - | 0.0229 |
| | $\ell_2$ | 0.0340 | 0.0287 | 0.0823 | - | +18% | - | 0.6612 |
| | $\ell_1$ | 0.1009 | 0.0843 | 0.0301 | - | +20% | - | 12.544 |
| CIFAR, 5 layer 10 filters 29360 hidden nodes | $\ell_\infty$ | 0.0042 | 0.0037 | 0.0000 | - | +14% | - | 0.0172 |
| | $\ell_2$ | 0.0324 | 0.0277 | 0.0842 | - | +17% | - | 0.4177 |
| | $\ell_1$ | 0.0953 | 0.0806 | 0.0805 | - | +18% | - | 11.6536 |

Runtimes to find bounds of minimum adversarial distortion on pure CNN networks

| Network | $\ell_p$ norm | Average Computation Time (sec) | | | | CNN-Cert Speed-up | | |
|---|---|---|---|---|---|---|---|---|
| | | CNN-Cert-Ada | Fast-Lin | Global-Lips | Dual-LP | vs. Fast-Lin sparse | vs. Fast-Lin | vs. Dual-LP |
| MNIST, 4 layer 5 filters 8680 hidden nodes | $\ell_\infty$ | 0.91 | 12.11 | 0.0001 | 853.20 | 5.2 | 13.3 | 939.3 |
| | $\ell_2$ | 0.98 | 12.20 | 0.0001 | 236.30 | 5.0 | 12.5 | 241.8 |
| | $\ell_1$ | 0.92 | 12.02 | 0.0001 | 227.69 | 5.1 | 13.0 | 246.9 |
| MNIST, 4 layer 20 filters 34720 hidden nodes | $\ell_\infty$ | 17.32 | - | 0.0001 | - | 2.0 | - | - |
| | $\ell_2$ | 17.17 | - | 0.0002 | - | 2.1 | - | - |
| | $\ell_1$ | 17.23 | - | 0.0001 | - | 2.1 | - | - |
| MNIST, 5 layer 5 filters 10680 hidden nodes | $\ell_\infty$ | 2.41 | 16.85 | 0.0001 | - | 3.0 | 7.0 | - |
| | $\ell_2$ | 2.25 | 17.11 | 0.0001 | - | 3.0 | 7.6 | - |
| | $\ell_1$ | 2.31 | 17.20 | 0.0001 | - | 3.0 | 7.5 | - |
| CIFAR, 7 layer 5 filters 19100 hidden nodes | $\ell_\infty$ | 15.11 | 78.04 | 0.0001 | - | 1.5 | 5.2 | - |
| | $\ell_2$ | 16.11 | 73.08 | 0.0001 | - | 1.4 | 4.5 | - |
| | $\ell_1$ | 14.93 | 76.89 | 0.0001 | - | 1.5 | 5.1 | - |
| CIFAR, 5 layer 10 filters 29360 hidden nodes | $\ell_\infty$ | 17.18 | - | 0.0001 | - | 1.9 | - | - |
| | $\ell_2$ | 17.11 | - | 0.0001 | - | 2.0 | - | - |
| | $\ell_1$ | 16.99 | - | 0.0001 | - | 1.9 | - | - |

FIG. 9

Runtimes and bounds of minimum adversarial distortion on general CNN networks

| Network | $\ell_p$ norm | Certified Bounds CNN-Cert-Relu | Certified Bounds CNN-Cert-Ada | Certified Bounds GlobalLips | CNN-Cert-Ada Imp. (%) vs. CNN-Cert-Relu | Attack CW/EAD | Average Computation Time (sec) CNN-Cert | Average Computation Time (sec) GlobalLips | Average Computation Time (sec) CW/EAD |
|---|---|---|---|---|---|---|---|---|---|
| MNIST, LeNet | $\ell_\infty$ | 0.0113 | 0.0120 | 0.0002 | +6% | 0.1705 | 9.54 | 0.0001 | 20.50 |
| | $\ell_2$ | 0.0617 | 0.0654 | 0.0000 | +6% | 5.1327 | 9.46 | 0.0001 | 5.56 |
| | $\ell_1$ | 0.1688 | 0.1794 | 0.0023 | +6% | 21.6101 | 9.45 | 0.0001 | 3.75 |
| MNIST, 7 layer | $\ell_\infty$ | 0.0068 | 0.0079 | 0.0000 | +16% | 0.1902 | 191.81 | 0.0001 | 41.13 |
| | $\ell_2$ | 0.0277 | 0.0324 | 0.0073 | +17% | 4.9597 | 194.82 | 0.0001 | 10.83 |
| | $\ell_1$ | 0.0542 | 0.0638 | 0.0000 | +18% | 19.6854 | 188.84 | 0.0001 | 6.31 |
| MNIST, LeNet No Pooling | $\ell_\infty$ | 0.0234 | 0.0273 | 0.0001 | +17% | 0.1240 | 10.05 | 0.0003 | 56.08 |
| | $\ell_2$ | 0.1680 | 0.2051 | 0.0658 | +22% | 3.7831 | 10.76 | 0.0003 | 8.17 |
| | $\ell_1$ | 0.5425 | 0.6655 | 0.0184 | +23% | 22.2273 | 11.63 | 0.0001 | 5.34 |
| MNIST, 4 layer 5 filters Batch Norm | $\ell_\infty$ | 0.0041 | 0.0045 | 0.0011 | +10% | 0.0785 | 1.47 | 0.0001 | 30.49 |
| | $\ell_2$ | 0.0370 | 0.0425 | 0.3023 | +15% | 0.8678 | 1.65 | 0.0002 | 8.26 |
| | $\ell_1$ | 0.1270 | 0.1460 | 0.1053 | +15% | 6.1088 | 1.53 | 0.0001 | 5.46 |
| MNIST, 4 layer 5 filters | $\ell_\infty$ | 0.0406 | 0.0492 | 0.0002 | +21% | 0.1488 | 1.66 | 0.0001 | 22.23 |
| | $\ell_2$ | 0.1454 | 0.1794 | 0.0491 | +23% | 3.1407 | 1.31 | 0.0001 | 5.78 |
| | $\ell_1$ | 0.2764 | 0.3363 | 0.0289 | +22% | 14.4516 | 1.49 | 0.0001 | 3.98 |

FIG. 10

Runtimes and bounds of minimum adversarial distortion on ResNet networks

| Network | $\ell_p$ norm | Certified Bounds | | CNN-Cert-Ada Impr. | Attack | Average Computation Time (sec) | | |
|---|---|---|---|---|---|---|---|---|
| | | CNN-Cert-Relu | CNN-Cert-Ada | vs. CNN-Cert-Relu | CW/EAD | CNN-Cert-Relu | CNN-Cert-Ada | CW/EAD |
| MNIST, ResNet-2 | $\ell_\infty$ | 0.0183 | 0.0197 | +8% | 0.0448 | 2.26 | 2.25 | 24.96 |
| | $\ell_2$ | 0.0653 | 0.0739 | +13% | 0.2892 | 2.21 | 2.25 | 5.59 |
| | $\ell_1$ | 0.1188 | 0.1333 | +12% | 4.8225 | 2.19 | 2.22 | 3.00 |
| MNIST, ResNet-3 | $\ell_\infty$ | 0.0179 | 0.0202 | +13% | 0.0423 | 10.39 | 10.04 | 32.82 |
| | $\ell_2$ | 0.0767 | 0.0809 | +5% | 0.3884 | 10.13 | 10.11 | 6.89 |
| | $\ell_1$ | 0.1461 | 0.1514 | +4% | 5.9454 | 10.20 | 10.15 | 4.22 |
| MNIST, ResNet-4 | $\ell_\infty$ | 0.0153 | 0.0166 | +8% | 0.0626 | 28.66 | 28.18 | 35.13 |
| | $\ell_2$ | 0.0614 | 0.0683 | +11% | 1.0094 | 28.43 | 28.20 | 7.89 |
| | $\ell_1$ | 0.1012 | 0.1241 | +23% | 9.1923 | 27.81 | 28.53 | 5.34 |

FIG. 11

Runtimes and bounds of minimum adversarial distortion on networks with general activation functions

| Network | $\ell_p$ norm | Certified Bounds | | | | | Average Computation Time (sec) | | | |
|---|---|---|---|---|---|---|---|---|---|---|
| | | CNN-Cert-Relu | CNN-Cert-Ada | Sigmoid | Tanh | Arctan | CNN-Cert-Relu | CNN-Cert-Ada | Sigmoid | Tanh | Arctan |
| MNIST, Pure CNN 8-layer 5 filters | $\ell_\infty$ | 0.0203 | 0.0237 | 0.0841 | 0.0124 | 0.0109 | 18.34 | 18.27 | 18.81 | 20.37 | 19.03 |
| | $\ell_2$ | 0.0735 | 0.0877 | 0.3441 | 0.0735 | 0.0677 | 18.25 | 18.22 | 18.83 | 19.70 | 19.05 |
| | $\ell_1$ | 0.1284 | 0.1541 | 0.7319 | 0.1719 | 0.1692 | 18.35 | 18.31 | 19.40 | 20.00 | 19.26 |
| MNIST, General CNN LeNet | $\ell_\infty$ | 0.0113 | 0.0120 | 0.0124 | 0.0170 | 0.0153 | 9.71 | 9.54 | 9.55 | 9.66 | 9.57 |
| | $\ell_2$ | 0.0617 | 0.0654 | 0.0616 | 0.1012 | 0.0912 | 9.45 | 9.46 | 9.42 | 9.49 | 9.50 |
| | $\ell_1$ | 0.1688 | 0.1794 | 0.1666 | 0.2744 | 0.2522 | 9.44 | 9.45 | 9.59 | 9.69 | 9.66 |
| MNIST, General CNN 7-layer | $\ell_\infty$ | 0.0068 | 0.0079 | - | 0.0085 | 0.0079 | 193.68 | 191.81 | - | 193.26 | 193.08 |
| | $\ell_2$ | 0.0277 | 0.0324 | - | 0.0429 | 0.0386 | 194.21 | 194.82 | - | 193.55 | 194.81 |
| | $\ell_1$ | 0.0542 | 0.0638 | - | 0.0955 | 0.0845 | 187.88 | 188.84 | - | 188.93 | 188.79 |
| MNIST, ResNet-3 | $\ell_\infty$ | 0.0179 | 0.0202 | 0.0042 | 0.0058 | 0.0088 | 10.39 | 10.04 | 10.08 | 10.26 | 10.26 |
| | $\ell_2$ | 0.0767 | 0.0809 | 0.0252 | 0.0223 | 0.0156 | 10.13 | 10.11 | 10.14 | 10.43 | 10.27 |
| | $\ell_1$ | 0.1461 | 0.1514 | - | 0.0399 | 0.0277 | 10.20 | 10.15 | 10.40 | 10.84 | 10.69 |

FRAMEWORK FOR CERTIFYING A LOWER BOUND ON A ROBUSTNESS LEVEL OF CONVOLUTIONAL NEURAL NETWORKS

BACKGROUND

The present invention relates generally to a certification method, and more particularly, but not by way of limitation, to a system, method, and computer program product for computing an adversarial robustness of artificial intelligence (AI) and/or machine-learning (ML) systems using convolutional neural networks (CNNs) with guarantees (i.e., a robustness certification).

Conventionally, studies on adversarial robustness of state-of-the-art machine learning models, particularly neural networks (NNs), have received great attention due to interests in model explainability and rapidly growing concerns on security implications. For example, in object recognition, imperceptible adversarial perturbations of natural images may be easily crafted to manipulate the model predictions, known as 'prediction-evasive adversarial attacks'.

One conventionally-used threat model for quantifying the attack strengths is the 'norm-ball bounded attacks'. In this model, a distortion between an original example and the corresponding adversarial example is measured by an '$L_p$ norm of their difference in real-valued vector representations' (e.g., pixel values for images or embeddings for texts).

Conventionally, the methodology for evaluating model robustness against adversarial attacks may be divided into two categories of 'game-based' or 'verification-based'. 'Game-based' approaches measure a success in mitigating adversarial attacks via mounting an empirical validation against a (self-chosen) set of attacks. However, many defense methods have shown to be broken or bypassed by attacks that are adaptive to these defenses under the same threat model. Therefore, the robustness of these conventional techniques may not extend to untested attacks.

On the other hand, 'verification-based' approaches provide a certified defense against any possible attacks under a threat model. In the case of an $L_p$ norm-ball bounded threat model, a verified robustness certificate ε means the (top-1) model prediction on the input data cannot be altered if the attack strength (i.e., distortion measured by $L_p$ norm) is smaller than ε. Different from 'game-based' approaches, 'verification-based' methods are attack-agnostic. Hence, they can formally certify robustness guarantees, which is crucial to security-sensitive and safety-critical applications.

Although conventional 'verification-based' approaches can provide a robustness certification, finding a minimum distortion (i.e., a maximum certifiable robustness) of NNs has been shown to be a non-deterministic polynomial time (NP)-complete problem. While the minimum distortion can be attained in small and shallow networks, these approaches are not scalable to moderate-sized NNs.

Some conventional techniques aim to circumvent a scalability issue by efficiently solving a non-trivial lower bound on the minimum distortion. However, these techniques may lack generality in supporting different network architectures and activation functions. And, conventional techniques often deal with convolutional layers by simply converting back to fully-connected layers, which may lose efficiency if not fully optimized with respect to the NNs.

SUMMARY

Thus, the inventors have identified a need in the art for a technique for a general and efficient verification framework for certifying a robustness of a broad range of convolutional neural networks (CNNs) including enabling the robustness certification of various architectures, such as convolutional layers, max-pooling layers batch normalization layers and residual blocks, and general activation functions. The efficiency of the proposed technique is optimized by exploiting the convolution operation.

In an exemplary embodiment, the present invention provides a computer-implemented certification method, the method including certifying an adversarial robustness of a convolutional neural network by deriving an analytic solution for a neural network output using an efficient upper bound and an efficient lower bound on an activation function and applying the analytic solution in computing a certified robustness.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 6 exemplarily depicts various building blocks for computing an output of the CNNs according to an embodiment of the present invention;

FIGS. 7-11 exemplarily depict results of the invention as compared to various conventional techniques;

DETAILED DESCRIPTION

Figure 1:
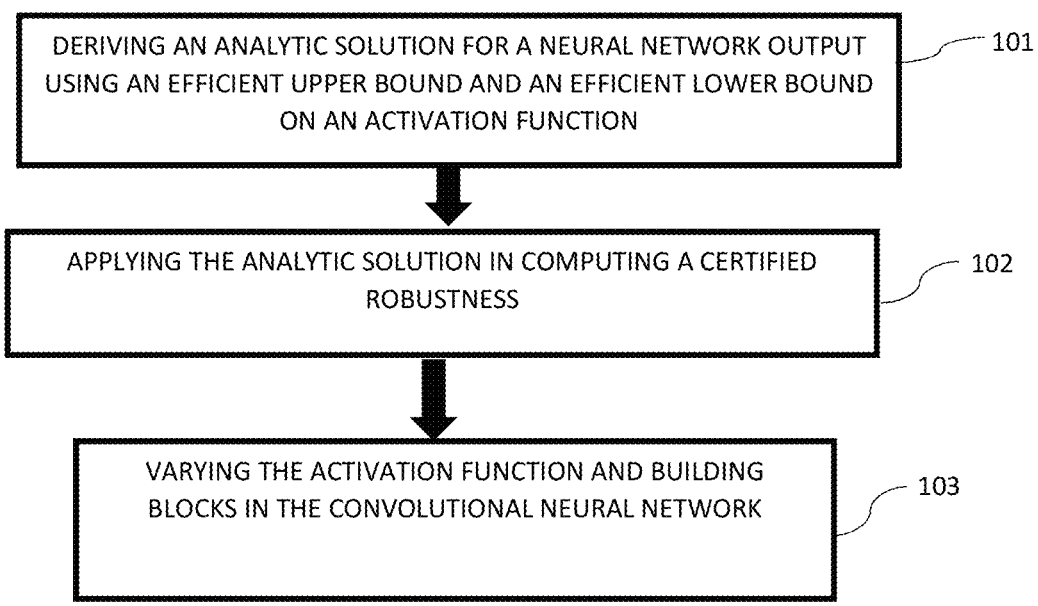
FIG. 1 exemplarily shows a high-level flow chart for a certification method 100 according to an embodiment of the present invention.

The invention will now be described with reference to FIGS. 1-14, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a certification method 100 according to the present invention can include various steps for certifying a robustness of any given model.

Figure 12:
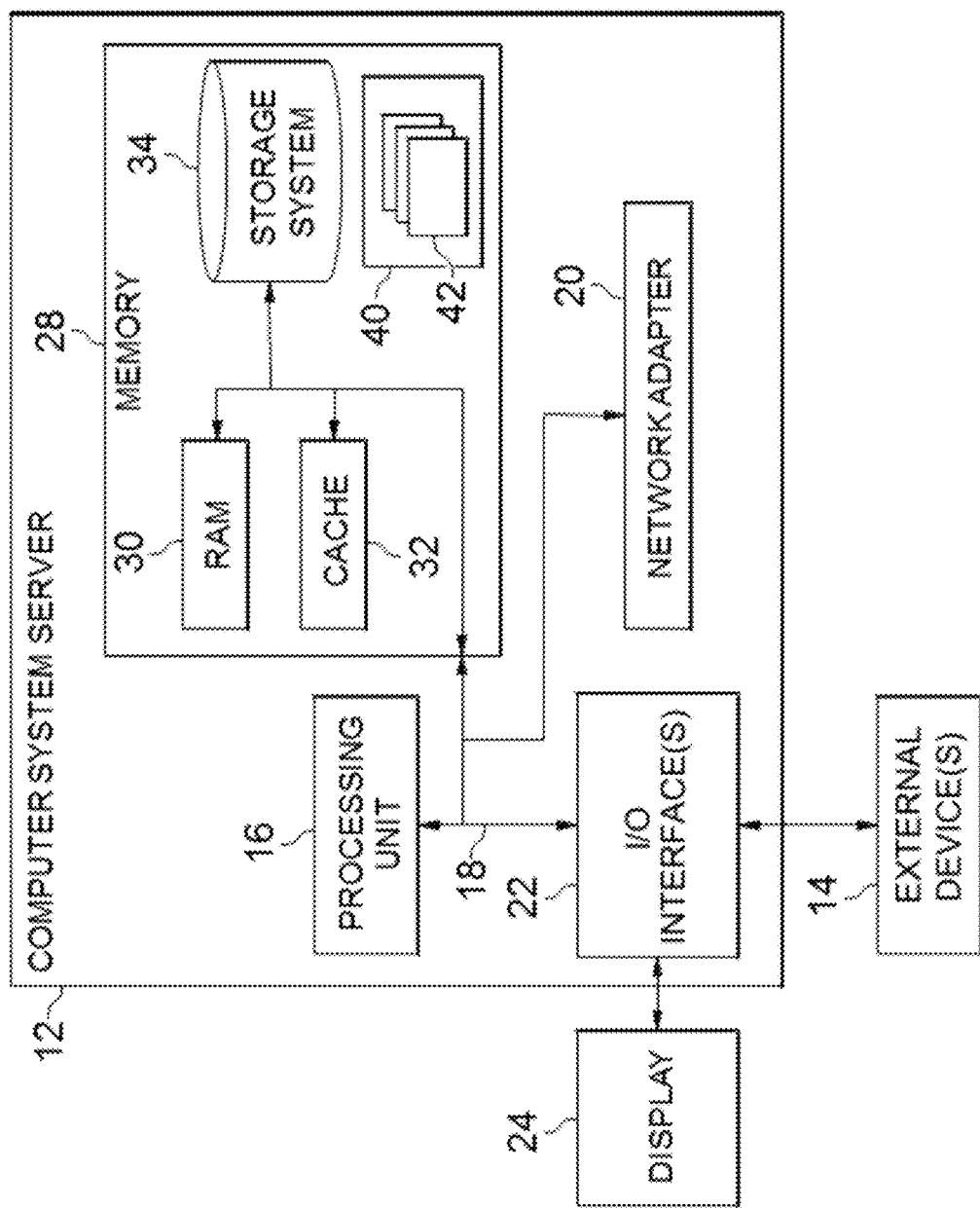
FIG. 12 depicts a cloud-computing node 10 according to an embodiment of the present invention.

By way of introduction of the example depicted in FIG. 12, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 14), it is nonetheless understood that the present invention can be implemented outside of the cloud environment.

It is noted that the invention includes certifying the level of robustness (some number) via efficient computation of lower bounds on (true) robustness value using the invention (a computation problem), and not certifying a CNN is robust or not (a yes or no problem).

With reference to FIG. 1, in step 101, an analytic solution is derived for a neural network output using an efficient upper bound and an efficient lower bound on an activation function. In step 102, the analytic solution is applied in computing a certified robustness. The analytic solution may be applied with a binary search. And, in step 103, the activation function and building blocks in the convolutional neural network are varied.

Figure 2:
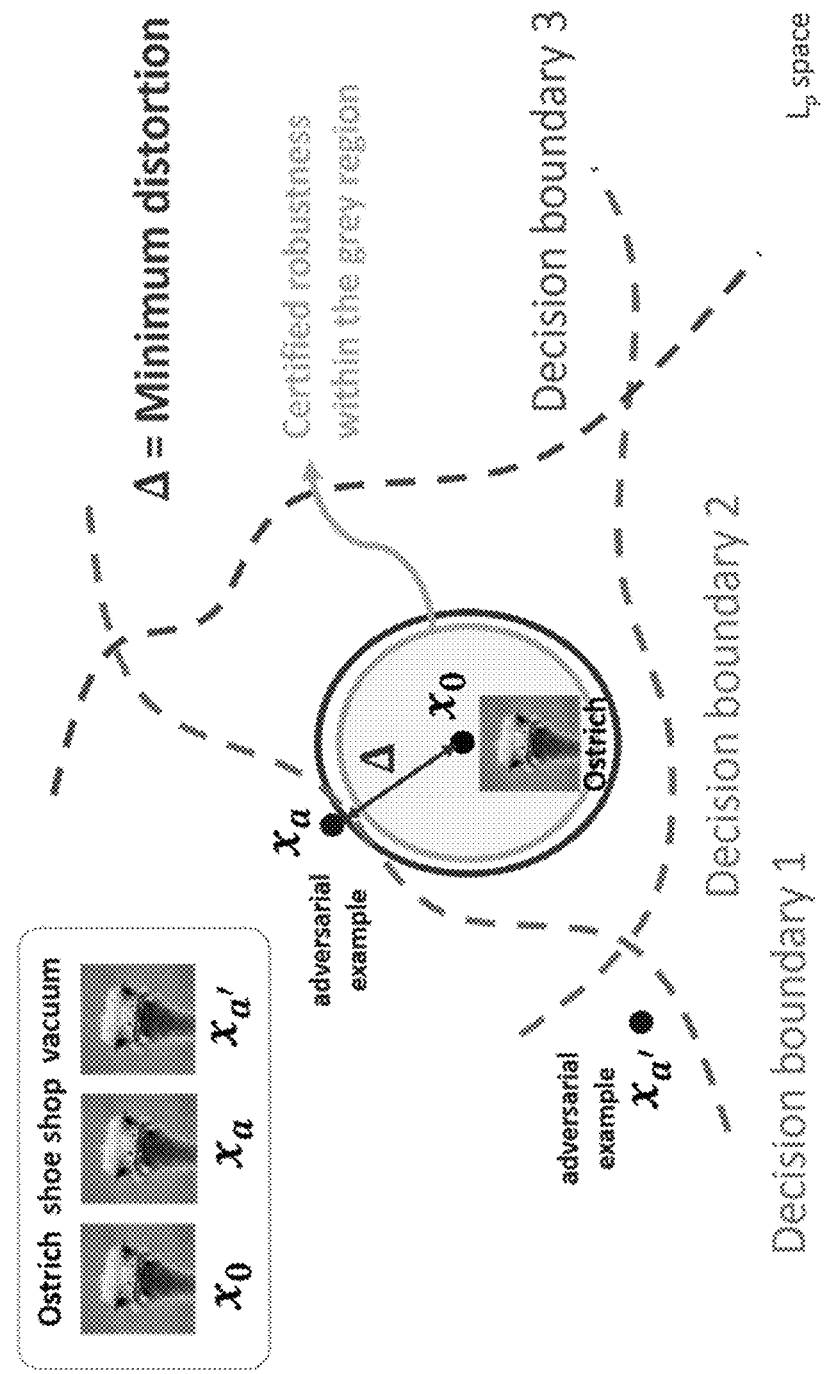
FIG. 2 exemplarily depicts an example of adversarial robustness according to an embodiment of the present invention.
Figure 3:
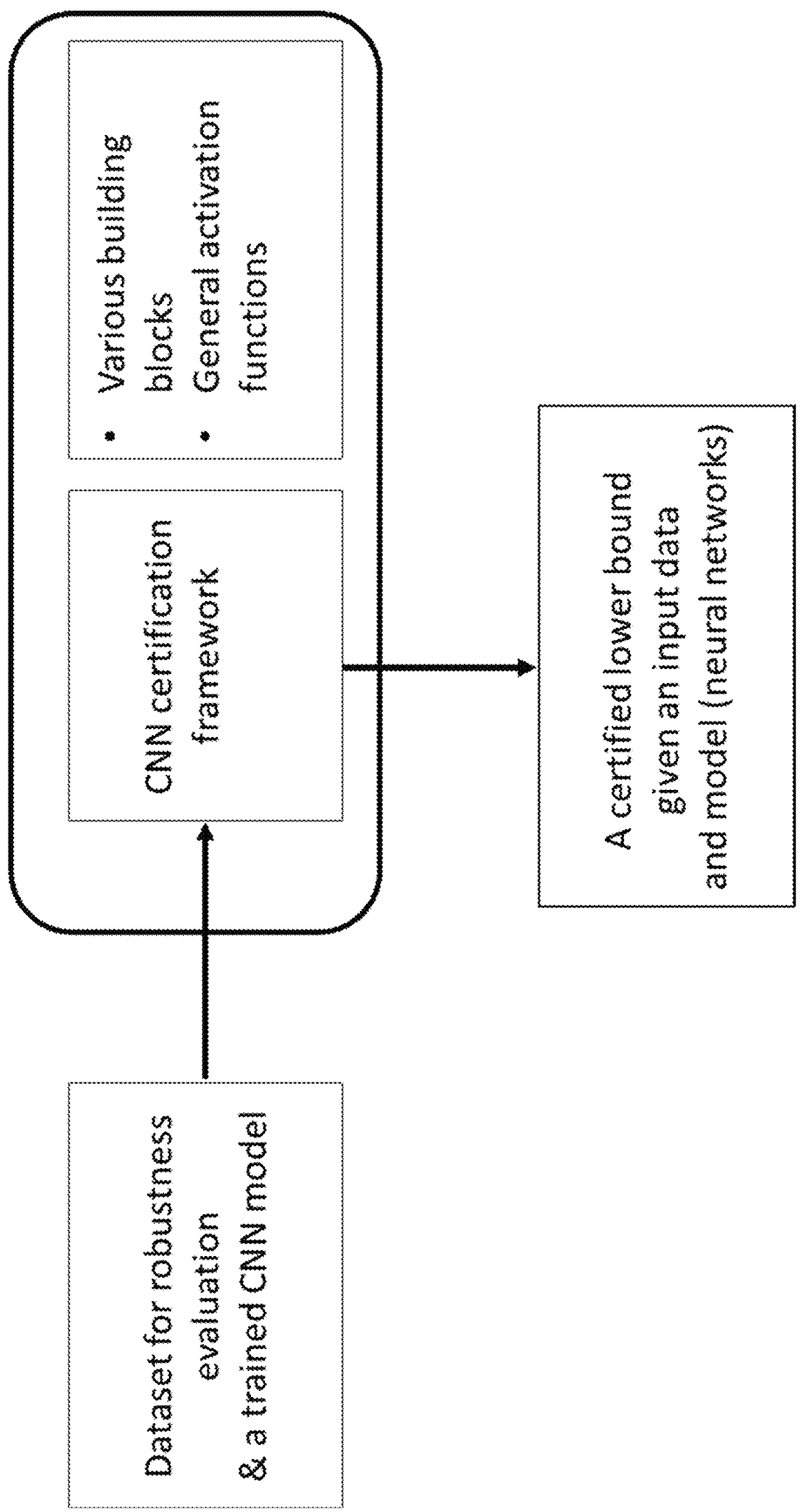
FIG. 3 exemplarily depicts a framework to certify robustness for convolutional neural networks (CNNs) with general activations according to an embodiment of the present invention.

With reference generally to FIGS. 1-11, the invention may determine how large of an adverse perturbation can be input into a system (i.e., how much an image can change) and still obtain (e.g., be classified as) the same result (i.e., how robust the system is to an adverse perturbation). For example, as shown in FIG. 2, the invention can determine the minimum distortion (i.e., adverse perturbation) between $X_0$ and $X_a$ such that the input returns the correct output from the model for the image (i.e., the image of an 'ostrich' is classified as an 'ostrich' and not a 'shoe shop'). The region where the image is properly classified with adverse perturbation (i.e., changes to the image) is referred to as the certified robustness of the system. The decision boundaries are set such that adverse examples of the input give an incorrect output (i.e., not classified as an 'ostrich'). Thus, for example, a 'certified' lower bound of 0.5 would mean that any value of 0.5 or less will end up with 'an ostrich' being classified. Thus, this provides certified robustness of the system.

The invention includes a general and efficient verification framework for certifying robustness of a broad range of convolutional neural networks (CNNs). The generality of the invention (i.e., 'CNN-Cert' as shown in the Figures) enables robustness certification of various architectures, including convolutional layers, max-pooling layers batch normalization layers and residual blocks, and general activation functions. The efficiency of CNN-Cert is optimized by exploiting the convolution operation.

That is, the invention is general and it can certify robustness on general CNNs composed of various building blocks, including convolutional layers, residual blocks, pooling layers and batch normalization layers, as well as general activation functions including but not limited to 'ReLU', 'tanh', 'sigmoid', 'arc tan', etc. Other variants can easily be incorporated.

Moreover, the invention is computationally efficient as it is a polynomial-time algorithm and has cost similar to forward-propagation (FP) as opposed to NP-completeness in formal verification methods (e.g., 'Reluplex'). Extensive experiments show that the invention achieves up to seventeen (17) times of speed-up compared to the state-of-the-art certification algorithms such as Fast-Lin and up to 940 times of speed-up compared to dual-LP (linear programming) approaches while the invention obtains similar or even better verification bounds.

Still with reference to FIGS. 1-11, the invention includes a general and efficient framework (i.e., 'CNN-Cert') for computing a certified robustness of minimum adversarial distortion with general activation functions in CNNs. The range of network output is derived in closed-form by applying a pair of efficient (i.e., linear) upper/lower bounds on the neurons (e.g. the activation functions, the pooling functions, varying building blocks in the CNN, etc.) when the input of the network is perturbed with noises bounded in $L_p$ norm ($p \geq 1$). The inventive framework may incorporate general activation functions and various architectures. Particularly, the results are provided on convolutional layers with activations (i.e., 'act-cony block'), max-pooling layers (i.e., 'pooling block'), residual blocks (i.e., 'residual block') and batch normalization layers (i.e., 'BN block').

Figure 5:
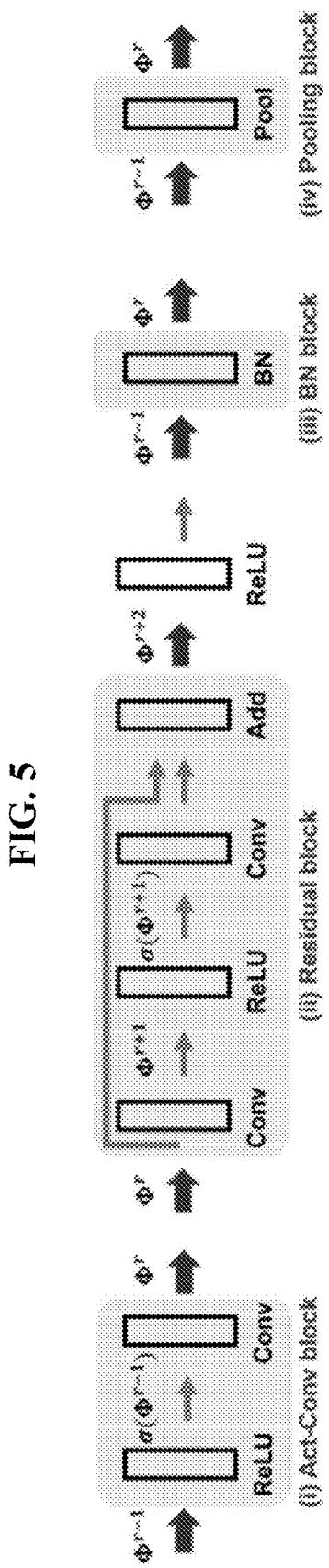
FIG. 5 exemplarily depicts a graph of building blocks (i)-(iv) considered in the framework according to an embodiment of the present invention.

The invention includes an input data point (i.e., an image such as in FIG. 2, text input, etc.) that is perturbed within an $L_p$ Ball with radius e. The invention detects the change of network output because this information can be used to find a certified robustness (i.e., certified lower bound) of minimum adversarial distortion. Toward this goal, the first step is to derive explicit output bounds for the neural network classifiers with various popular building blocks, as shown in FIGS. 5-6.

The invention applies an efficient (i.e., linear) bounding technique separately on the non-linear operations in the neural networks (e.g., the non-linear activation functions, residual blocks and pooling operations, etc.). The invention is general and allows efficient computations of the certified robustness.

Notations and intuitions are given next of deriving explicit bounds for each building block followed by the descriptions of utilizing such explicit bounds to compute the certified robustness (i.e., $\rho_{cert}$) in the framework.

To explain the invention, for notation, let f(x) be a neural network classifier function and $x_0$ be an input data point. $\sigma(\bullet)$ is used to denote the coordinate-wise activation function in the neural networks. Some popular choices of $\sigma$ include ReLU: $\sigma(y)=\max(y, 0)$, hyperbolic tangent: $\sigma(y)=\tanh(y)$, sigmoid: $\sigma(y)=1/(1+e-y)$ and arctan: $\sigma(y)=\tan^{-1}(y)$. The symbol * denotes the convolution operation and $\Phi^r(x)$ denotes the output of r-th layer building block, which is a function of an input x. Superscripts are used to denote an index of layers and subscripts to denote upper bound (U), lower bound (L) and its corresponding building blocks (e.g., 'act' is short for activation, 'conv' is short for convolution, res is short for residual block, 'bn' is short for batch normalization and 'pool' is short for pooling). Sometimes subscripts are also used to indicate the element index in a vector/tensor, which is self-content. $\Phi^r(x)$ is written as $\Phi_r$ for simplicity and $\Phi^m(x)$ is used to denote the output of the classifier (i.e. $\Phi^m=f(x)$). It is noted that the weights W, bias b, input x and the output $\Phi^m$ of each layer are tensors since a general CNN is considered.

For the convolutional layer with an activation function $\sigma(\cdot)$, let $\Phi^{r-1}$ be the input of activation layer and $\Phi^r$ be the output of convolutional layer. The input/output relation is as follows in equation (1):

$$\Phi^r = W^r * \sigma(\Phi^{r-1}) + b^r. \quad (1)$$

Given the range of $\Phi^{r-1}$, the invention can bound the range of $\Phi^r$ by applying two linear bounds on each activation function $\sigma(y)$ as in equation (2):

$$\alpha_L(y+\beta_L) \leq \sigma(y) \leq \alpha_U(y+\beta_U). \quad (2)$$

When the input y is in the range of [l, u], the parameters $\alpha_L$, $\alpha_U$, $\beta_L$, $\beta_U$ can be chosen appropriately based on y's lower bound l and upper bound u. Using equation (2) and considering the signs of the weights associated to the activation functions, it is possible to show that the output $\Phi^r$ in equation (1) can be bounded where $A_{U,act}^r$, $A_{L,act}^r$, $B_{U,act}^r$, $B_{L,act}^r$ i are constant tensors related to weights $W^r$ and bias $b^r$ as well as the corresponding parameters $\alpha_L$, $\alpha_U$, $\beta_L$, $\beta_U$ in the linear bounds of each neuron as follows in equations (3) and (4):

$$\Phi^r \leq A_{U,act}^r * \Phi^{r-1} + B_{U,act}^r \quad (3)$$

$$\Phi^r \geq A_{L,act}^r * \Phi^{r-1} + B_{L,act}^r, \quad (4)$$

It is noted that FIG. 6 depicts the full results. It is further noted the bounds in equations (3) and (4) are element-wise inequalities. On the other hand, if $\Phi^{r-1}$ is also the output of convolutional layer (i.e., $\Phi^{r-1} = W^{r-1} * \sigma(\Phi^{r-2}) + b^{r-1}$) such that the bounds in equations (3) and (4) can be rewritten as follows in equations (5) and (6):

$$\Phi^r \leq A_{U,act}^r * \Phi^{r-1} + B_{U,act}^r = A_{U,act}^r * (W^{r-1} * \sigma(\Phi^{r-2}) + b^{r-1}) + B_{U,act}^r \quad (5)$$
$$= A_{U,conv}^{r-1} * \sigma(\Phi^{r-2}) + B_{U,conv}^{r-1} + B_{U,act}^r$$

and similarly $$\Phi^r \geq A_{L,act}^r * \Phi^{r-1} + B_{L,act}^r = A_{L,act}^r * \sigma(\Phi^{r-2}) + B_{L,conv}^{r-1} + B_{L,act}^r \quad (6)$$
by letting $A_{U,conv}^{r-1} = A_{U,act}^r * W^{r-1}$, $B_{U,conv}^{r-1} = A_{U,act}^r * b^{r-1}$,
and $A_{L,conv}^{r-1} = A_{L,act}^r * W^{r-1}$, $B_{L,conv}^{r-1} = A_{L,act}^r * b^{r-1}$.

It is observed that the form of the upper bound in equation (5) and lower bound in equation (6) become the same convolution form again as equation (1). Therefore, for a neural network including convolutional layers and activation layers, the above technique can be used iteratively to obtain the final upper and lower bounds of the output $\Phi^r$ in terms of the input of neural network $\Phi^0(x)=x$ in the following convolutional form of:

$$A_{L,conv}^0 * x + B_L^0 \leq \Phi^r(x) \leq A_{U,conv}^0 * x + B_U^0.$$

In fact, the above framework is general and is not limited to the convolution-activation building blocks. The framework can also incorporate popular residual blocks, pooling layers and batch normalization layers, etc. The invention derives efficient (i.e., linear) upper bounds and lower bounds for each building block in the form of equations (3) and (4), and then plug in the corresponding bounds and back-propagate to the previous layer.

For the residual block, $\Phi^{r+2}$ denotes the output of residual block (e.g., before activation) and $\Phi^{r+1}$ is the output of first convolutional layer. $\Phi^r$ is the input of residual block. The input/output relation is as follows:

$$\Phi^{r+1} = W^{r+1} * \Phi^r + b^{r+1}$$

$$\Phi^{r+2} = W^{r+2} * \sigma(\Phi^{r+1}) + b^{r+2} + \Phi^r$$

Similar to the linear bounding techniques for up-wrapping the non-linear activation functions, the output of residual block can be bounded as:

$$\Phi^{r+2} \leq A_{U,res}^{r+2} * \Phi^r + B_{U,res}^{r+2}$$

and $$\Phi^{r+2} \geq A_{L,res}^{r+2} * \Phi^r + B_{L,res}^{r+2}$$

where $A_{U,res}^{r+2}$, $A_{L,res}^{r+2}$, $B_{U,res}^{r+2}$, $B_{L,res}^{r+2}$ are constant tensors related to weights $W^{r+2}$, $W^{r+1}$, bias $b^{r+2}$, $b^{r+1}$, and the corresponding parameters $\alpha_L$, $\alpha_U$, $\beta_L$, $\beta_U$ in the linear bounds of each neuron (e.g., see FIG. 6). It is noted that in FIG. 6, all indices are shifted from r+2 to r.

The batch normalization layer performs operations of scaling and shifting during inference time. $\Phi^r$ is the output and $\Phi^{r-1}$ is the input, the input/output relation is the following:

$$\Phi^r = \gamma_{bn} \frac{\Phi^{r-1} - \mu_{bn}}{\sqrt{\sigma_{bn}^2 + \epsilon_{bn}}} + \beta_{bn},$$

where $\gamma_{bn}$, $\beta_{bn}$ are the learned training parameters and $\mu_{bu}$, $\sigma_{bn}$ are the running average of the batch mean and variance during training.

$$\text{Let } h(y) = \gamma_{bn} \frac{y - \mu_m}{\sqrt{\sigma_{bn}^2 + \epsilon_{bn}}} + \beta_{bn},$$

then the output can be bounded as follows:

$$h(l^r) \leq \Phi^r(x) \leq h(u^r), \text{ if } \gamma_{bn} \geq 0;$$

$$h(u^r) \leq \Phi^r(x) \leq h(l^r), \text{ if } \gamma_{bn} < 0,$$

when the input $\Phi^{r-1}$ lies within the range $[l_r, u_r]$.

For pooling operation, $\Phi^r$ and $\Phi^{r-1}$ are the output and input of the pooling layer. For max-pooling operations, the input/output relation is $$\Phi_n^r = \max_{S_n} \Phi_{S_n}^{r-1},$$

where $S_n$ denotes the pooled input index set associated with the n-th output. When the input $\Phi^{r-1}$ is bounded in the range $[l_r, u_r]$, it is possible to bound the output $\Phi_r$ by linear functions by $\Phi^r \leq A_{U,pool}^r * \Phi^{r-1} + B_{U,pool}^r$ and $\Phi^r \geq A_{L,pool}^r * \Phi^{r-1} + B_{L,pool}^r$, where $A_{U,pool}^r$, $A_{L,pool}^r$, $B_{U,pool}^r$, $B_{L,pool}^r$ are constant tensors related to $l_r$ and $u_r$. For average pooling operation, the range of the output $\Phi^r$ is the average of $l^r$ and $u^r$ on the corresponding pooling indices (e.g., as in FIG. 6).

Figure 4:
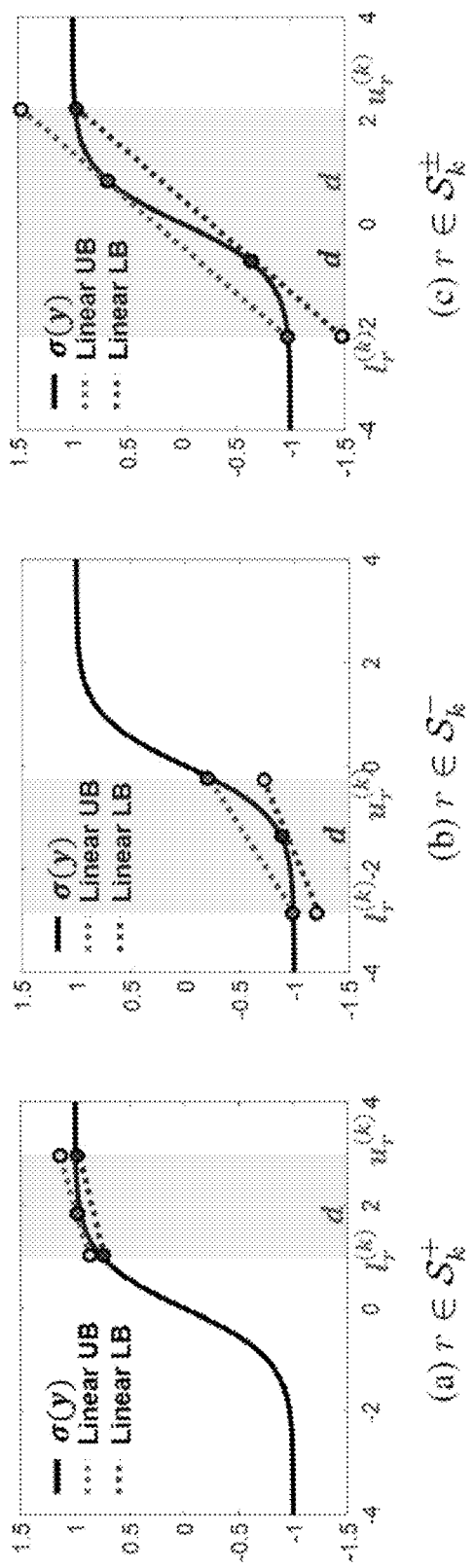
FIG. 4 exemplarily depicts an efficient (e.g., linear) lower bounds and upper bounds on activation functions considered in the framework according to an embodiment of the present invention.

For computing global bounds (i.e., upper and lower bounds $\eta_{j,U}$ and $\eta_{j,L}$ of network output $\Phi^m(x)$), $\Phi^m(x)$ is set as the output of a m-th layer neural network classifier (e.g., as shown in FIG. 4). Above it is shown that when the input of each building block is bounded and lies in the range of some [l, u], then the output of the building block can be bounded by two efficient (i.e., linear) functions in the form of input convolution. Since a neural network can be regarded as a cascade of building blocks (i.e., the input of a current building block is the output of a previous building block) the invention can propagate the bounds from the last building block that relates the network output backward to the first building block that relates the network input x. A final upper bound and lower bound connect the network output and input are in the following relationship of equation (7):

$$A_L^{0}*x+B_L^{0} \leq \Phi^m(x) \leq A_U^{0}*x+B_U^{0}. \quad (7)$$

It is noted that the input x is constrained within an $L_p$ ball $\mathbb{B}_p(x_0, \epsilon)$ centered at input data point $x_0$ and with radius $\epsilon$. Thus, maximizing the right-hand side of equation (7) over $X \in \mathbb{B}_p(x_0, \epsilon)$ leads to a global upper bound of j-th output $\Phi_j^m(x)$: of equation (8):

$$\eta_{j,U}=\epsilon\|vec(A_U^{0})\|_q+A_U^{0}*x_0+B_U^{0}, \quad (8)$$

where $\|\cdot\|_q$ is $L_q$ norm and $1/p+1/q=1$ with p, q≥1.

Similarly, a global lower bound of $\Phi_j^m(x)$: can be obtained by minimizing the left-hand side of equation (7) which leads to equation (9) as follows:

$$\eta_{j,L}=-\epsilon\|vec(A_L^{0})\|_q+A_L^{0}*x_0+B_L^{0}. \quad (9)$$

To compute the certified robustness (i.e., certified lower bound $p_{cert}$), recall that the predicted class of input data $x_0$ is c and let t be a targeted class. Given the magnitude of a largest input perturbation $\epsilon$, the invention can check if the output of $\Phi_c^m(x)-\Phi_t^m(x)>0$ is satisfied by applying the global bounds derived in equations (8) and (9). In other words, given an $\epsilon$, the invention will check the condition if $\eta_{c,L}-\eta_{t,U}>0$. If the condition is true, then the invention can increase $\epsilon$; otherwise decrease $\epsilon$. That is, the certified robustness is optimized as compared to some threshold value.

Thus, the largest certified robustness can be attained by a bisection on $\epsilon$. It is noted that although there is an explicit $\epsilon$ term in equations (8) and (9), they are not a linear function in $\epsilon$ because all of the intermediate bounds of $\Phi^r$ depends on $\epsilon$. However, the invention can still find $\rho_{cert}$ numerically via the aforementioned bisection method.

On the other hand, it is also noted that the derivation of output bounds $\Phi^r$ in each building block depends on the range $[l_r-1, u_r-1]$ of the building block input (e.g., $\Phi^{r-1}$), which is called the intermediate bounds. The value of the intermediate bounds can be computed similarly by treating $\Phi^{r-1}$ as the final output of the sub-network which includes of all building blocks before layer r-1 and deriving the corresponding $A_U^{0}, A_L^{0}, B_U^{0}, B_L^{0}$ in equation(7). Thus, all the intermediate bounds also have the same form as in equations (8) and (9) but substituted by its corresponding $A_U^{0}, A_L^{0}, B_U^{0}, B_L^{0}$.

It is noted that 'Fast-Lin' is a special case in two aspects. First, the 'Fast-Lin' technique uses two linear bounds with the same slope (i.e. $\alpha_U=\alpha_L$ in equation (2)) on the 'ReLU' activation, whereas in invention different slopes are possible ($\alpha_U$ and $\alpha_L$ can be different). Indeed, the freedom of adaptive selection on the slopes based on the input ranges (l, u) of each neuron is important to achieve a better bound quality as shown experiments (e.g., see FIGS. 7-11). In addition, in the invention, a can be any activation functions rather than just 'ReLU' as long as two corresponding linear bounds with parameters $\alpha_U, \alpha_L, \beta_U, \beta_L$ can be found. Second, 'Fast-Lin' only considers fully-connected layers (multilayer perception (MLP)), whereas the invention can deal with various building blocks and architectures such as residual blocks, pooling blocks and bath normalization blocks.

Moreover, the invention has a similar cost to forward-propagation for general convolutional neural networks (i.e., it takes polynomial time, unlike algorithms that find the exact minimum adversarial distortion which is NP-complete). As shown in FIGS. 7-11, the invention demonstrates an empirical speedup as compared to the original versions of 'Fast-Lin', an optimized sparse matrix versions of 'Fast-Lin', and 'Dual-LP approaches' while maintaining similar or better certified bounds (the improvement is around 8-20%). Thereby, the invention is computationally efficient.

Further, training-time operations are independent of the invention. That is, since the invention is certifying the robustness of a fixed classifier 'f' at the testing time, learning techniques that only apply to the training phase, such as dropout, will not affect the operation of the invention (i.e., though the given model to be certified might vary if model weights differ).

Comparative methods are used to show the inventive results of the invention. That is, the invention is compared with (i) 'Fast-Lin' as the fast certified lower bound for ReLU networks, (ii) 'Global-Lips' which finds a certified lower bound by computing the global Lipschitz constant, (iii) 'Dual-LP' which solves the dual problem of the linear programming (LP) formulation, (iv) 'CW/EAD' which are based on the attack methods, and (v) 'CNN-Cert-Relu' which is the invention with the same linear bounds on ReLU used in 'Fast-Lin', while CNN-Cert-Ada uses adaptive bounds on the ReLU function or other activation function. CNNs are converted into equivalent MLP networks before evaluation for methods that only support MLP networks.

The invention and the other methods (i)-(v) are evaluated on CNN models trained on the MNIST and CIFAR-10 datasets. All pure convolutional networks use 3-by-3 convolutions. The general 7-layer CNN trained on MNIST uses two max pooling layers and uses 32 and 64 filters for two convolution layers each. LeNet uses a similar architecture to LeNet-5, with the no-pooling version applying the same convolutions over larger inputs. The residual networks (i.e., 'ResNet') evaluated uses simple residual blocks with two convolutions per block. The experiments denote a 'ResNet' with k residual blocks as 'ResNet-k'. The experiments evaluate the methods on 10 random test images and attack targets (in order to accommodate slow verification methods). The experiments train all models for 10 epochs, tuning hyper-parameters to optimize validation accuracy for each network category.

The invention is implemented with Python (numpy with numba) using a similar setup as 'Fast-Lin'. The experiments are also implemented via a version of 'Fast-Lin' using sparse matrix multiplication for comparison with the invention since convolutional layers correspond to sparse weight matrices. Experiments are conducted on an AMD Zen server CPU running at a maximum of 3.4 GHz.

FIG. 7 demonstrates that the invention (i.e., CNN-Cert) bounds consistently improve on 'Fast-Lin' over a network size. The invention also improves on 'Dual-LP'. Attack results show that all certified methods leave a significant gap on the attack-based distortion bounds (i.e., upper bounds on the minimum distortions). FIG. 8 illustrates the runtimes of various methods to certify bounds on minimum adversarial distortion. The invention is faster than 'Fast-Lin', with over an order of magnitude speed-up for the smallest network. The invention is also faster than the sparse version of 'Fast-Lin'. The runtime improvement of the invention decreases with network size. Notably, the invention is multiple orders of magnitude faster than the 'Dual-LP' method. 'Global-Lips' is an analytical bound, but it provides very loose lower bounds by merely using the product of layer weights as the Lipschitz constant. In contrast, the invention takes into account the network output at the neuron level and thus can certify significantly larger lower bounds, and is around 8-20% larger compared to 'Fast-Lin' and 'Dual-LP' approaches.

FIG. 9 illustrates a certified robustness for various general CNNs including networks with pooling layers and batch normalization. The invention improves upon 'Fast-Lin' style ReLU bounds ('CNN-Cert-Relu'). The 'LeNet' style network without pooling layers has certified bounds of approximately one order of magnitude larger than the pooling version. The network with batch normalization has higher certified bounds for $L_1$ perturbations, but a lower robustness for $L_\infty$ and $L_2$ perturbations. These findings provide some new insights on uncovering the relation between certified robustness and network architecture, and the invention could potentially be leveraged to search for more robust networks. FIG. 10 computes certified lower bounds for residual networks. Similarly, the invention improves upon 'Fast-Lin' style ReLU bounds.

FIG. 11 computes a certified robustness for networks with four different activation functions. For ReLU networks, both adaptive bounds ('CNN-Cert-Ada') and 'Fast-Lin' style ReLU bounds (CNN-Cert-Relu) are used. Some sigmoid network results are omitted due to poor test set accuracy. Thereby, it is concluded that the invention can efficiently find non-trivial lower bounds for all the tested activation functions. The experiment also notes that computing a certified robustness for activation functions other than ReLU incurs no significant computational penalty.

Indeed, the above descriptions include a new inventive approach (i.e., CNN-Cert), which includes a general and efficient verification framework for certifying robustness of CNNs. By using the inventive block-wise linear bounding technique, the invention attains computational efficiency and is able to support a wide variety of network architectures including convolution, max-pooling, batch normalization, residual blocks, as well as arbitrary activation functions. Extensive results under four different classes of CNNs consistently validate the superiority of the invention over other methods in terms of its effectiveness in solving tighter non-trivial certified robustness and its efficiency in runtime analysis.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 12, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 13:
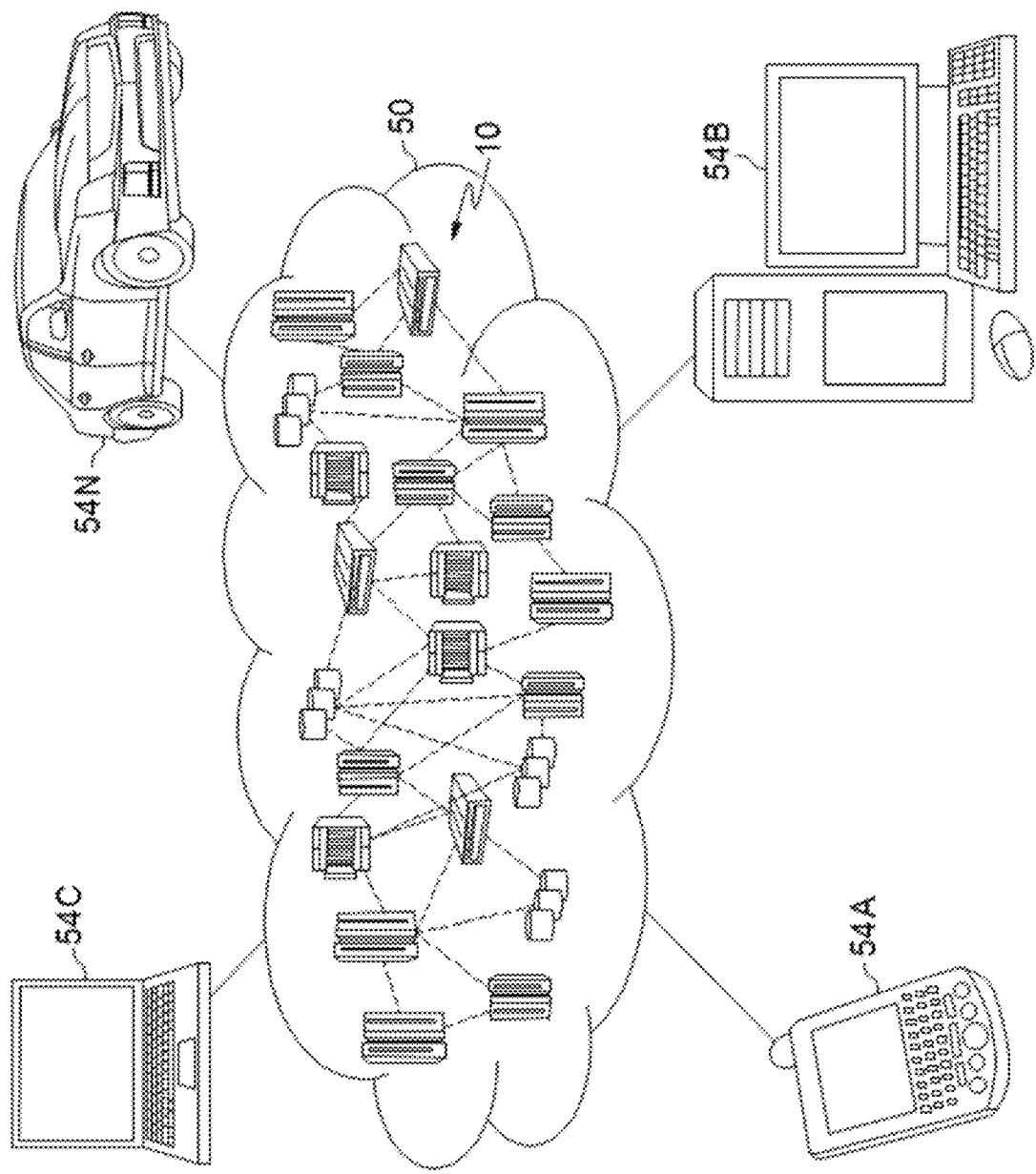
FIG. 13 depicts a cloud-computing environment 50 according to an embodiment of the present invention.

Referring now to FIG. 13, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 13 are intended to be illustrative only and that computing nodes 10 and cloud computing environment 50 can communicate with any type of computerized circuit over any type of network and/or network addressable connection (e.g., using a web browser).

Figure 14:
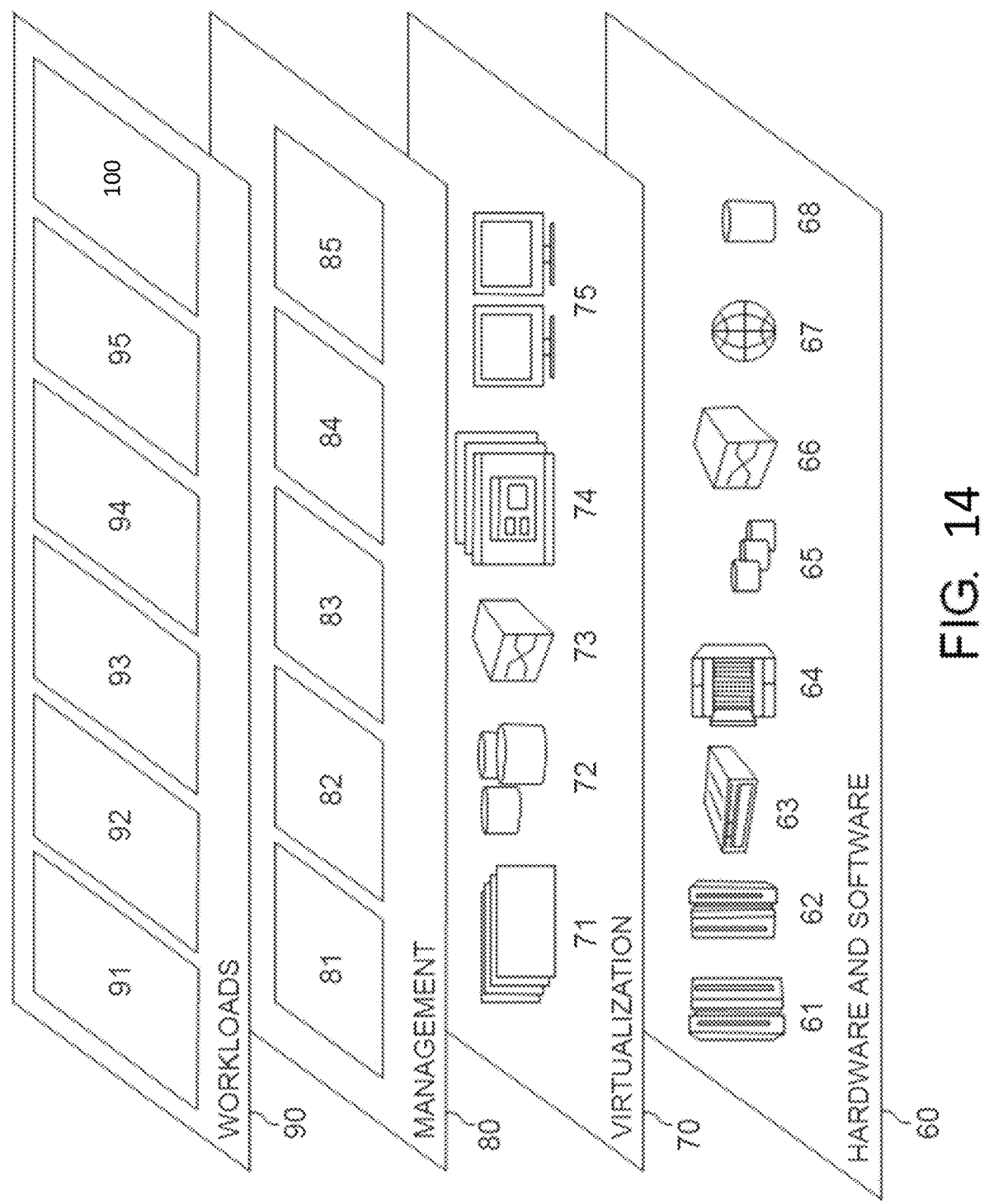
FIG. 14 depicts abstraction model layers according to an embodiment of the present invention.

Referring now to FIG. 14, an exemplary set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and certification method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented certification method, the method comprising:
    certifying a numerical level of robustness of various architectures of convolutional neutral networks (CNNs) with minimum adversarial distortion by:
        deriving an analytic solution for a neural network output of the CNNs using an efficient block-wise linear bound on an activation function separately on non-linear operations in the CNNs,
    wherein the efficient bound is derived using convolution operations.

2. The method of claim 1, further comprising varying the activation function.

3. The method of claim 2, wherein the activation function is varied until a numerical level of robustness of the neural network is within a predetermined threshold value.

4. The method of claim 1, further comprising varying building blocks in the neural network.

5. The method of claim 4, wherein the activation function is varied until a numerical level of robustness of the neural network is within a predetermined threshold value.

6. The method of claim 1, further comprising varying both of the activation function and building blocks in the neural network.

7. The method of claim 1, wherein the analytic solution is applied with a binary search.

8. The method of claim 1, wherein an efficient upper bound as one of the efficient bound comprises a linear upper bound, and
    wherein an efficient lower bound as one of the efficient bound comprises a linear lower bound.

9. The method of claim 1, wherein the adversarial robustness is certified for a same input.

10. The method of claim 1, embodied in a cloud-computing environment.

11. The method of claim 1, further comprising computing the numerical level of the robustness a specific architecture of the CNNs based on the analytic solution,
    wherein the analytic solution includes deriving, for each building block in the form of element-wise inequality equations, and then plugging in the corresponding bounds and back-propagate to a previous layer of the CNNs.

12. A computer program product for certification, the computer program product comprising a computer-readable storage medium having program instructions embodied therewith, the program instructions executable by a computer to cause the computer to perform:
    certifying a numerical level of robustness of various architectures of convolutional neutral networks (CNNs) with minimum adversarial distortion by:
        deriving an analytic solution for a neural network output of the CNNs using an efficient block-wise linear bound on an activation function separately on non-linear operations in the CNNs,
    wherein the efficient bound is derived using convolution operations.

13. The computer program product of claim 12, further comprising varying the activation function.

14. The computer program product of claim 13, wherein the activation function is varied until a certified robustness of the neural network is within a predetermined threshold value.

15. The computer program product of claim 12, further comprising varying building blocks in the neural network.

16. The computer program product of claim 15, wherein the activation function is varied until a certified robustness of the neural network is within a predetermined threshold value.

17. The computer program product of claim 12, further comprising varying both of the activation function and building blocks in the neural network.

18. The computer program product of claim 12, wherein the analytic solution is applied with a binary search.

19. The computer program product of claim 12, wherein an efficient upper bound as one of the efficient bound comprises a linear upper bound, and
wherein an efficient lower bound as one of the efficient bound comprises a linear lower bound.

20. A certification system, the system comprising:
a processor, and
a memory, the memory storing instructions to cause the processor to perform:
certifying a numerical level of robustness of various architectures of convolutional neutral networks (CNNs) with minimum adversarial distortion by:
deriving an analytic solution for a neural network output of the CNNs using an efficient block-wise linear bound on an activation function separately on non-linear operations in the CNNs,
wherein the efficient bound is derived using convolution operations.

* * * * *